United States Patent
Kim et al.

(10) Patent No.: US 10,467,503 B1
(45) Date of Patent: Nov. 5, 2019

(54) METHOD AND DEVICE FOR GENERATING IMAGE DATA SET TO BE USED FOR LEARNING CNN CAPABLE OF DETECTING OBSTRUCTION IN AUTONOMOUS DRIVING CIRCUMSTANCE

(71) Applicant: STRADVISION, INC., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

(*) Notice: Subject to any disclaimer, the term of this patent is extended or adjusted under 35 U.S.C. 154(b) by 0 days.

(21) Appl. No.: 16/121,659

(22) Filed: Sep. 5, 2018

(51) Int. Cl.
*G06K 9/62* (2006.01)
*G06K 9/00* (2006.01)

(52) U.S. Cl.
CPC ....... *G06K 9/6256* (2013.01); *G06K 9/00805* (2013.01); *G06K 9/6262* (2013.01)

(58) Field of Classification Search
CPC . G06K 9/00805; G06K 9/6256; G06K 9/6262
See application file for complete search history.

(56) References Cited

U.S. PATENT DOCUMENTS

| | | | | |
|---|---|---|---|---|
| 2017/0061625 | A1* | 3/2017 | Estrada | G06K 9/6267 |
| 2017/0124415 | A1* | 5/2017 | Choi | G06N 3/08 |
| 2018/0336471 | A1* | 11/2018 | Rezagholizadeh | G06N 3/088 |
| 2019/0042925 | A1* | 2/2019 | Choe | G06N 3/063 |
| 2019/0096135 | A1* | 3/2019 | Dal Mutto | G06T 19/006 |

OTHER PUBLICATIONS

Georgakis, Georgios, et al. "Synthesizing Training Data for Object Detection in Indoor Scenes.", Jul. 2017 (Year: 2017).*
Su et al. "Multi-view convolutional neural networks for 3d shape recognition." Proceedings of the IEEE international conference on computer vision. 2015. (Year: 2015).*

* cited by examiner

Primary Examiner — Katrina R Fujita
(74) Attorney, Agent, or Firm — Xsensus, LLP

(57) ABSTRACT

A method of generating at least one training data set including steps of: (a) a computing device acquiring (1) an original image and (ii) an initial synthesized label generated by using an original label and a bounding box corresponding to an arbitrary specific object (b) the computing device supporting a CNN module to generate a first synthesized image and a first synthesized label by using the original image and the initial synthesized label, wherein the first synthesized label is created by adding a specific label to the original label at a location in the original label corresponding to a location of the bounding box in the initial synthesized label, and wherein the first synthesized image is created by adding a specific image o to the original image at a location in the original image corresponding to the location of the bounding box in the initial synthesized label.

12 Claims, 4 Drawing Sheets

METHOD AND DEVICE FOR GENERATING IMAGE DATA SET TO BE USED FOR LEARNING CNN CAPABLE OF DETECTING OBSTRUCTION IN AUTONOMOUS DRIVING CIRCUMSTANCE

FIELD OF THE INVENTION

The present invention relates to a method and a device for generating image data set to be used for learning CNN capable of detecting obstruction in autonomous driving circumstances, and more particularly, to a method of generating at least one image data set to be used for learning CNN capable of detecting at least one obstruction in one or more autonomous driving circumstances, including steps of: (a) a computing device acquiring (i) an original image representing a road driving circumstance and (ii) an initial synthesized label generated by using an original label corresponding to the original image and a bounding box corresponding to an arbitrary specific object wherein the arbitrary specific object does not relate the original image (b) the computing device supporting a CNN module to generate a first synthesized image and a first synthesized label by using the original image and the initial synthesized label, wherein the first synthesized label is created by adding a specific label corresponding to the specific object to the original label at a location in the original label corresponding to a location of the bounding box, corresponding to the specific object, in the initial synthesized label, and wherein the first synthesized image is created by adding a specific image of the specific object to the original image at a location in the original image corresponding to the location of the bounding box, corresponding to the specific object, in the initial synthesized label and a computing device using the same.

BACKGROUND OF THE INVENTION

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of machine learning.

Meanwhile, image segmentation is a method of generating a label image using an input image, e.g., a training image, a test image. Recently, the Deep Learning has been so much widespread that the Deep Learning is also being applied to the image segmentation.

By the way, while learning parameters of CNNs in order to detect obstructions in autonomous driving circumstances, the learning device have to learn a variety of objects which may be faced in the autonomous driving circumstances. And for this, training images should include a variety of objects which may be faced in the autonomous driving circumstances.

In a real driving circumstances, there may be variety of objects on the road, but it is not easy to collect these data. In other words, training images including unique objects which appears hardly in the road may not be collected easily from normal driving video data. For example, images of human, bicycles, or cars may be acquired easily from the normal driving video data so that the learning device may learn the parameters of CNN by using training images with these common objects, but images of a tiger, or alligator may not be acquired easily from the normal driving video data so that the learning device cannot learn the parameters of CNN by using images with these unique objects.

SUMMARY OF THE INVENTION

It is an object of the present invention to solve all problems explained above.

It is another object of the present invention to provide a method for generating training image sets to be used for increasing a performance of detecting objects which cannot be faced often in a real driving situation in autonomous driving circumstances.

It is still another object of the present invention to provide a method for generating synthesized images including bounding boxes.

It is still yet another object of the present invention to provide a method for generating synthesized images more similar to real images and synthesized labels by performing processes of supporting a CNN module to receive a first synthesized image, a first synthesized label and a value of a random seed as inputs of the CNN module, and then supporting the CNN module to iteratively (i) generate one or more intermediate synthesized images and one or more intermediate synthesized labels, and (ii) receive the generated intermediate synthesized images and the generated intermediate synthesized labels as the inputs of the CNN module.

In accordance with one aspect of the present invention, there is provided a method of generating at least one image data set to be used for learning CNN capable of detecting at least one obstruction in one or more autonomous driving circumstances, including steps of: (a) a computing device acquiring (i) an original image representing a road driving circumstance and (ii) an initial synthesized label generated by using an original label corresponding to the original image and a bounding box corresponding to an arbitrary specific object wherein the arbitrary specific object does not relate to the original image (b) the computing device supporting a CNN module to generate a first synthesized image and a first synthesized label by using the original image and the initial synthesized label, wherein the first synthesized label is created by adding a specific label corresponding to the specific object to the original label at a location in the original label corresponding to a location of the bounding box, corresponding to the specific object, in the initial synthesized label, and wherein the first synthesized image is created by adding a specific image of the specific object to the original image at a location in the original image corresponding to the location of the bounding box, corresponding to the specific object, in the initial synthesized label.

As one example, at the step of (a), the computing device further acquires (iii) a value of a random seed, and wherein, at the step of (b), the computing device supports the CNN module to generate a plurality of adjusted first synthesized images by using the original image, the initial synthesized label, and the value of the random seed, wherein the adjusted first synthesized images are derived from the first synthesized image such that at least part of a size, a location, and a color of the specific object in each of the adjusted first synthesized images are adjusted from those of the specific object in the first synthesized image while changing the value of the random seed.

As one example, at the step of (a), the computing device further acquires (iii) a value of a random seed, and wherein the method further comprises a step of: (c) the computing device supporting the CNN module to receive the first synthesized label, the first synthesized image, and the value of the random seed as inputs of the CNN module, and then supporting the CNN module to iteratively (i) generate one or more intermediate synthesized labels and one or more intermediate synthesized images and (ii) receive the generated intermediate synthesized labels and the generated intermediate synthesized images as the inputs of the CNN module, wherein, at the step of (c), while iteratively generating the intermediate synthesized labels and the intermediate synthesized images, the computing device iteratively combines the specific label and the specific image corresponding to the specific object with the generated intermediate synthesized labels and the generated intermediate synthesized images, respectively, such that the specific label and the specific image are respectively located at a same or similar location, corresponding to the location of the bounding box in the initial synthesized label, in the generated intermediate synthesized images and the generated intermediate synthesized labels, to thereby generate a second synthesized label and a second synthesized image.

As one example, on condition that shapes of bounding box candidates, to be provided for allowing the bounding box to be selected thereamong, corresponding to the specific object follow a probability distribution, a shape of the bounding box is determined by referring to the probability distribution As one example, on condition that widths and heights of the bounding box candidates corresponding to the specific object follow a first probability distribution and a second probability distribution respectively, the shape of the bounding box is determined by determining the width and the height by referring to the first and the second probability distributions respectively.

As one example, on condition that locations of the bounding box candidates corresponding to the specific object follow a probability distribution which is acquired by referring to information on relative locations of various objects, in various images, whose types and sizes are similar to a type and a size of the specific object, the location of the bounding box corresponding to the specific object is determined by referring to the probability distribution.

As one example, the method further includes a step of: (d) the computing device adding the first synthesized image and the first synthesized label into a database including training data sets to be used for one of object detection and image segmentation.

In accordance with another aspect of the present invention, there is provided a computing device of generating at least one image data set to be used for learning CNN capable of detecting at least one obstruction in one or more autonomous driving circumstances, including: a communication part for acquiring (i) an original image representing a road driving circumstance and (ii) an initial synthesized label generated by using an original label corresponding to the original image and a bounding box corresponding to an arbitrary specific object wherein the arbitrary specific object does not relate to the original image; and a processor for performing a process of (I) supporting a CNN module to generate a first synthesized image and a first synthesized label by using the original image and the initial synthesized label, wherein the first synthesized label is created by adding a specific label corresponding to the specific object to the original label at a location in the original label corresponding to a location of the bounding box, corresponding to the specific object, in the initial synthesized label, and wherein the first synthesized image is created by adding the specific image of the specific object to the original image at a location in the original image corresponding to the location of the bounding box, corresponding to the specific object, in the initial synthesized label.

As one example, the communication part further acquires (iii) a value of a random seed, and wherein, at the process (I), the processor performs a process of supporting the CNN module to generate a plurality of adjusted first synthesized images by using the original image, the initial synthesized label, and the value of the random seed, wherein the adjusted first synthesized images are derived from the first synthesized image such that at least part of a size, a location, and a color of the specific object in each of the adjusted first synthesized images are adjusted from those of the specific object in the first synthesized image while changing the value of the random seed.

As one example, the communication part further acquires (iii) a value of a random seed, and wherein the processor further performs a process of: (II) supporting the CNN module to receive the first synthesized label, the first synthesized image, and the value of the random seed as inputs of the CNN module, and then supporting the CNN module to iteratively (i) generate one or more intermediate synthesized labels and one or more intermediate synthesized images repeatedly and (ii) receive the generated intermediate synthesized labels and the generated intermediate synthesized images as the inputs of the CNN module, wherein, at the process of (II), while iteratively generating the intermediate synthesized labels and the intermediate synthesized images, the processor iteratively combines the specific label and the specific image corresponding to the specific object with the generated intermediate synthesized labels and the generated intermediate synthesized images, respectively, such that the specific label and the specific image are respectively located at a same or similar location corresponding to the location of the bounding box in the initial synthesized label, in the generated intermediate synthesized images and the generated intermediate synthesized labels, to thereby generate a second synthesized label and a second synthesized image.

As one example, on condition that shapes of bounding box candidates, to be provided for allowing the bounding box to be selected thereamong, corresponding to the specific object, follow a probability distribution, a shape of the bounding box is determined by referring to the probability distribution.

As one example, on condition that widths and heights of the bounding box candidates corresponding to the specific object follow a first probability distribution and a second probability distribution respectively, the shape of the bounding box is determined by determining the width and the height by referring to the first probability distribution and the second probability distributions respectively.

As one example, on condition that locations of the bounding box candidates corresponding to the specific object follow a probability distribution which is acquired by referring to information on relative locations of various objects, in various images, whose types and sizes are similar to a type and a size of the specific object, the location of the bounding box corresponding to the specific object is determined by referring to the probability distribution.

As one example, the processor further performs a process of: (III) adding the first synthesized image and the first synthesized label into a database including training data sets to be used for one of object detection and image segmentation.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
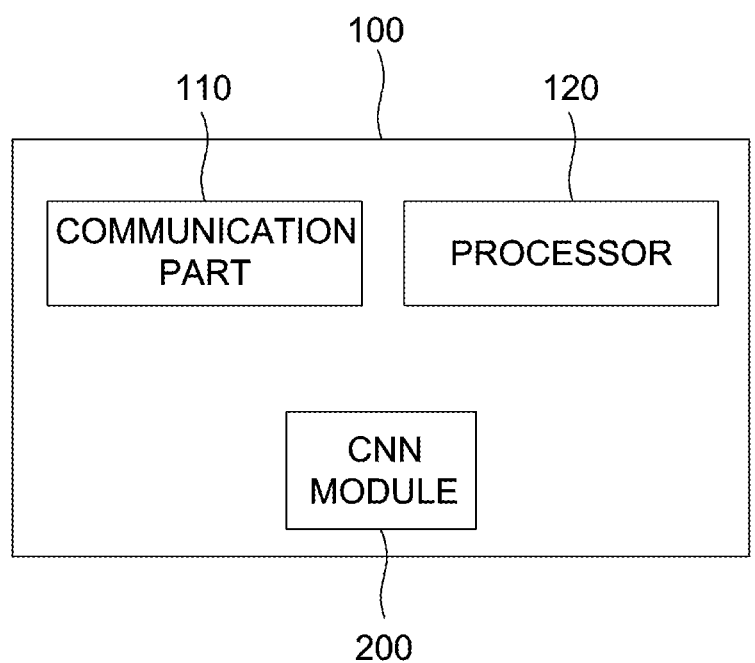
FIG. 1 shows a configuration of a computing device in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make those skilled in the art embody the present invention easily, desirable example embodiments of the present invention will be explained more specifically by referring to drawings attached.

FIG. 1 shows a configuration of a computing device in accordance with the present invention.

Referring to FIG. 1, the computing device 100 may include a CNN module 200. An input process and an output process of the CNN module 200 may be performed by a communication part 110, and various processes of applying operations may be performed by a processor 120.

Figure 2:
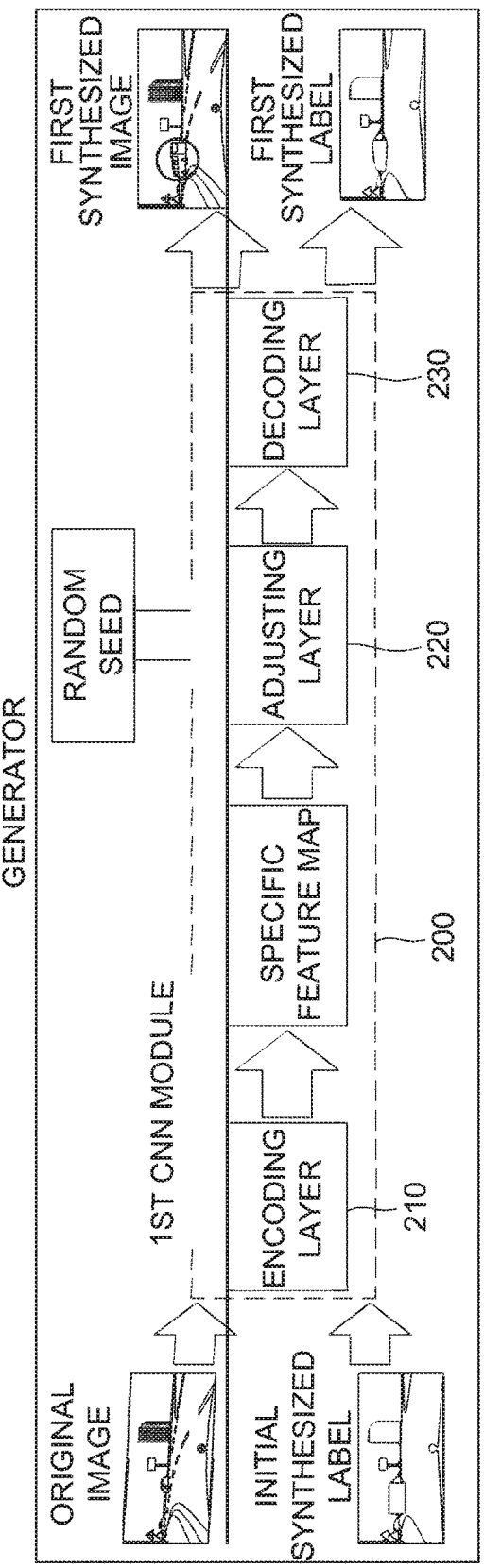
FIG. 2 shows a configuration of a CNN module capable of applying various operations to its inputs.

FIG. 2 shows how the CNN Module 200 applies various operations to its input.

Referring to FIG. 2, the CNN module 200 may include an encoding layer 210, an adjusting layer 220, and a decoding layer 230.

Specifically, the encoding layer 210 may perform a process of generating one or more feature maps by applying one or more convolution operations to an original image and an initial synthesized label. The adjusting layer 220 may perform a process of generating an adjusted feature map by using a specific feature map outputted lastly from the encoding layer and a value of a random seed. The decoding layer 230 may perform a process of generating a first synthesized image and a first synthesized label by applying one or more deconvolution operations to the adjusted feature map.

Explaining the convolution operations performed in the encoding layer in detail, the encoding layer 210 acquires the original image and the initial synthesized label to generate the feature maps. After concatenating the original image and the initial synthesized label channel-wise, which are 3-channel and 1-channel data respectively, the original image and the initial synthesized label are converted to 4-channel data, and the encoding layer 210 may apply the convolution operations to the 4-channel data.

As compositions of the computing device and the CNN module have been examined, how the computing device 100 generates training data sets, which is an object of the present invention, will be explained by referring to FIG. 3.

Figure 3:
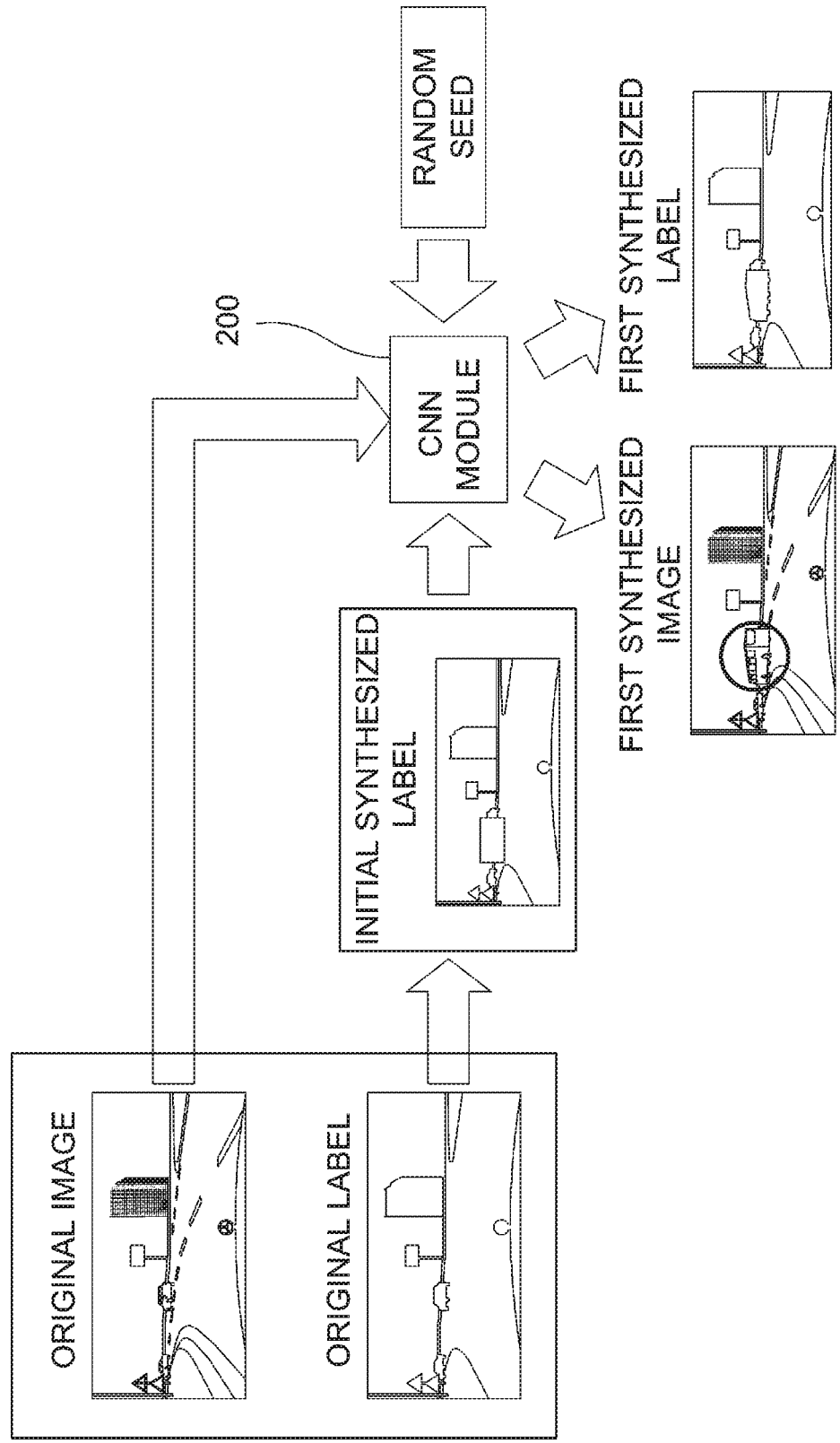
FIG. 3 shows a process of the CNN module generating a first synthesized image and a first synthesized label in accordance with one example embodiment of the present invention.

FIG. 3 shows a process of the CNN module generating the training data sets.

Referring to FIG. 3, the computing device 100 may allow the communication part 110 to acquire (i) the original image representing a road driving circumstance and (ii) the initial synthesized label. The initial synthesized label is generated by using an original label corresponding to the original image and a bounding box corresponding to an arbitrary specific object. Herein, the specific arbitrary object does not relate to the original image.

When the computing device 100 acquires the original image and the initial synthesized label, the computing device 100 supports the CNN module 200 to generate the first synthesized image and the first synthesized label by using the original image and the initial synthesized label.

The first synthesized image is created by adding a specific image of the specific object, corresponding to the bounding box, to the original image at a location in the original image corresponding to the location of the bounding box, of the specific object, in the initial synthesized label.

Herein, the first synthesized label is created by adding a specific label, corresponding to the specific object, to the original label at a location in the original label corresponding to a location of the bounding box, of the specific object, in the initial synthesized label.

Referring to FIG. 3, it may be seen that an image of a bus corresponding to the bounding box is combined with the original image and the specific label corresponding to the bus is combined with the original label.

The process of generating the first synthesized image and the first synthesized label may be performed by the processor 120.

For example, referring to FIG. 3, when (i) the original image including a road, (ii) the original label corresponding to the original image and (iii) the bounding box corresponding to a big-sized bus (objects which may exist on the road but hard to see, for example a cow or fallen rocks, may be applicable) are acquired, the initial synthesized label may be generated by combining the original label and the bounding box corresponding to the big-sized bus. After that, the CNN module may generate (i) the first synthesized image by combining a specific image of the big-sized bus with the original image such that the specific image of the big-sized bus is located on the road in the original image, and (ii) the first synthesized label by replacing the bounding box in the initial synthesized label with the specific label of the big-sized bus.

Herein, the computing device 100 may acquire the initial synthesized label (i) after the computing device 100 generates the initial synthesized label by itself or (ii) after another module (not described) coupled with the computing device 100 generates the initial synthesized label and then delivers the initial synthesized label to the computing device 100. In the former case, the original label and the bounding box may be inputted to the computing device 100.

Meanwhile, image synthesizing techniques well known to those skilled in the art may be used to generate the first synthesized image and the first synthesized label. Specifically, after the bounding box is combined with the original label, the specific label corresponding to the bounding box may be combined at a location in the original label corresponding to a location of the bounding box in the initial synthesized label to thereby generate the first synthesized label, and the specific image corresponding to the specific object included in the bounding box may be combined at a location in the original image corresponding to a location of the bounding box in the initial synthesized label to thereby generate the first synthesized image.

Figure 4:
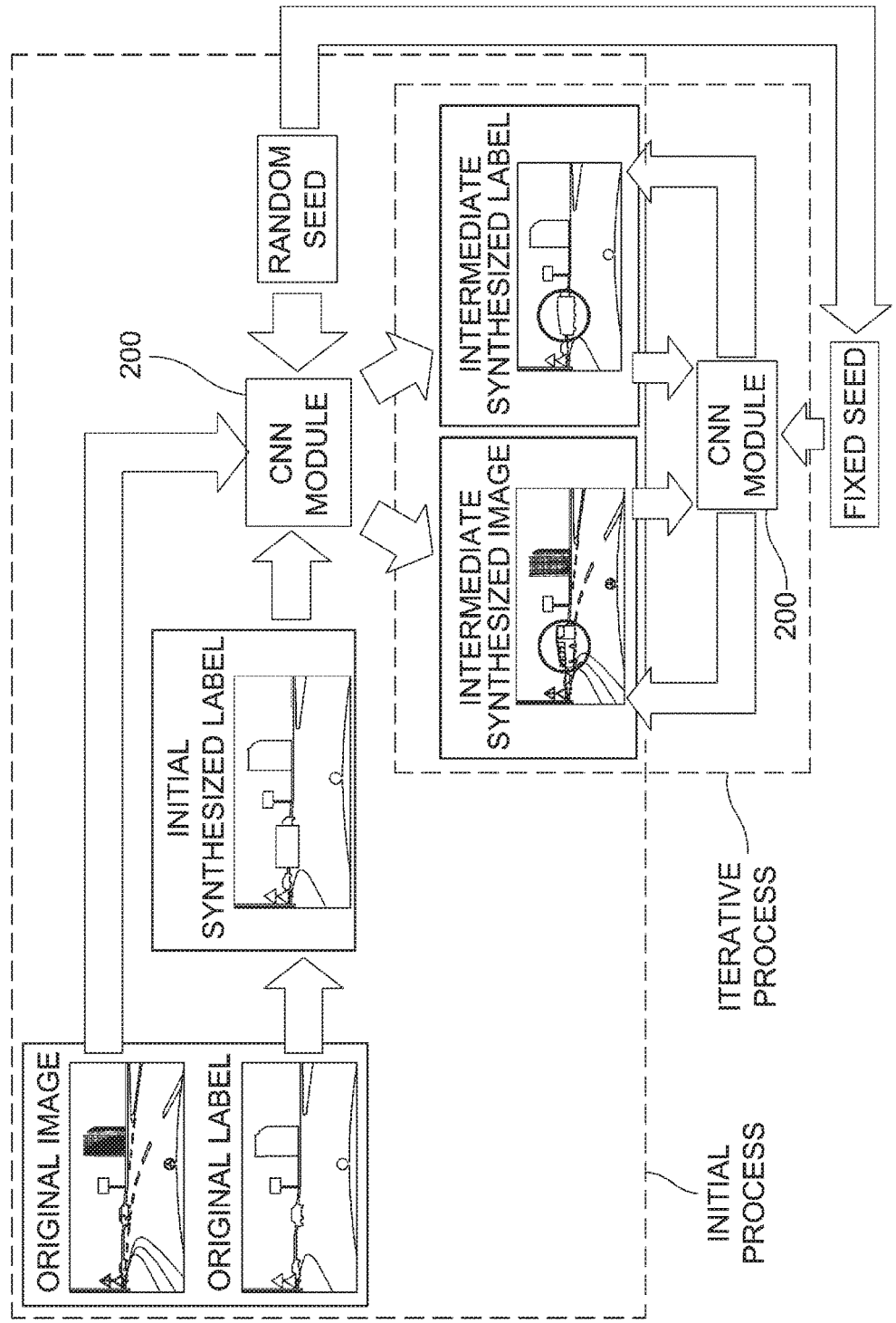
FIG. 4 shows an iterative process of the CNN module to generate a second synthesized image and a second synthesized label by using a value of a random seed.

In FIG. 2, FIG. 3, and FIG. 4, there are circles in the first synthesized image, the intermediate synthesized label and the intermediate synthesized image. The circles are just shown to emphasize that the specific label corresponding to the big-sized bus or the specific image corresponding to the big-sized bus are added on the first synthesized image, the intermediate synthesized label or the intermediate synthesized image. That is, the circles per se are not included in the intermediate synthesized label, the intermediate synthesized image or the first synthesized image.

In FIG. 2, it is shown as if the CNN module should acquire the value of the random seed to generate the first synthesized image, but the value of the random seed is not an essential input in the present invention. Herein, a "seed" is a kind of input of a function, and if the value of the seed is fixed, at least one characteristic of an output of the function gets fixed. Thus, if the value of the random seed continuously changes, it can be used to make the output of the function various.

Referring to FIG. 2, if the CNN module 200 further acquires the random seed whose value is not fixed, the computing device 100 may support the CNN module 200 to generate a plurality of the adjusted first synthesized images and the adjusted first synthesized labels by using the original images, the initial synthesized labels and the value of the random seed.

However, if the CNN module does not additionally acquire the value of the random seed or acquires a value of a fixed seed, it may only generate simply the first synthesized image combined with the image of the big-sized bus whose characteristic is constant so that it cannot reflect various cases needed for training.

To prevent this shortcoming, the value of the random seed varying continuously may be additionally inputted. Accordingly, the adjusted first synthesized images are generated such that at least one of a color, a shape, and a location of the bus varies in the adjusted first synthesized images.

FIG. 4 show an iterative process to acquire the second synthesized image which is more similar to a real image.

Referring to FIG. 4, as an initial process, the computing device 100 supports the CNN module 200 to acquire the original image, the initial synthesized label and the value of the random seed, to thereby generate a first synthesized label and a first synthesized image.

During the iterative process, the computing device supports the CNN module to receive the first synthesized label, the first synthesized image, and the value of the random seed, and then supports the CNN module to iteratively (i) generate one or more intermediate synthesized labels and one or more intermediate synthesized images, and (ii) receive the generated intermediate synthesized labels and the generated intermediate synthesized images as the inputs of the CNN module.

Herein, while iteratively generating the intermediate synthesized labels and the intermediate synthesized images, the computing device 100 iteratively combines the specific label and the specific image corresponding to the specific object with the generated intermediate synthesized labels and the generated intermediate synthesized images, respectively, such that the specific label and the specific image are respectively located at a same or similar location, corresponding to the location of the bounding box in the initial synthesized label, in the generated intermediate synthesized images and the generated intermediate synthesized labels, to thereby acquire an enough result. The enough result is a state that, supposing an image decision module which tells input images are fake or real, the image decision module cannot tell whether a certain inputted intermediate synthesized image is fake or real. When the enough result is achieved, the computing device supports the CNN module to finally output a second synthesized label and a second synthesized image which are the lastly generated intermediate image and the lastly generated intermediate label at the end of the iterative process. The value of the random seed may be randomly determined during the initial process and it may be constant during the later iterative process, but it is not limited thereto.

By performing the iterative process of the FIG. 4, the specific object with a constant shape and color and the specific label corresponding to the specific object may be combined at the same or similar location in each of the intermediate synthesized images and each corresponding intermediate synthesized label, respectively. By performing the iterative process as described above, the second synthesized image more similar to a real image and the second synthesized label corresponding to the second synthesized image may be acquired.

Meanwhile, when the bounding box corresponding to the specific object is combined with the original label, because a shape of the specific object may be various and the specific object may exist anywhere in the initial synthesized image, the shape and the location of the bounding box should be determined case by case. So, how the shape and the location of the bounding box are determined will be examined.

The specific object, e.g., a deer, a body ratio of the deer according to a standard body shape may exist, and according to that, a probability of a deer with long body, that of a deer with short body, that of a deer with long legs and that of a deer with short legs may be calculated. Thus, it may be supposed that the shapes of bounding box candidates, to be provided for allowing the bounding box to be selected thereamong, corresponding to the specific object, i.e., a deer in this example, follow a probability distribution, and the shape of the bounding box may be determined by referring to the probability distribution.

There may be many ways of determining the shape of the bounding box after the probability distribution is determined. One of the ways may be that, supposing that the shape of the bounding box is a rectangular and each of a width and a height of the bounding box follows a first probability distribution and a second probability distribution respectively, the shape of the bounding box is determined by referring to the first probability distribution and the second probability distribution.

Meanwhile, in an image, an object located close to the viewer appears big and an object located far away from the viewer appears small, according to the law of perspective. Thus, on condition that a standard size of an object of the same kind of the specific object corresponding to the bounding box exists, it may appear far away from the viewer in the image if the size of the specific object is smaller than the standard size, and it may appear close to the viewer in the image if the size of the specific object is bigger than the standard size. Thus, the location of the bounding box candidates may be supposed that it follows a probability distribution which is acquired by referring to information on relative locations of various objects, in various images, whose types and sizes are similar to a type and a size of the specific object and accordingly, the location of the bounding box may be determined by referring to the supposed probability distribution.

When the first synthesized image and the first synthesized label are generated, the first synthesized image and the first synthesized label (or the second synthesized image and the second synthesized label) may be added into a database in which training data sets to be used for one of object detection and image segmentation are stored.

The present invention has an effect of generating training image sets to be used for increasing a performance of detecting objects which cannot be faced often in a real driving situation in autonomous driving circumstances.

Also, the present invention has another effect of generating synthesized images including bounding boxes.

In addition, the present invention has still another effect of generating synthesized images more similar to real images and synthesized labels by performing processes of supporting a CNN module to receive a first synthesized image, a first synthesized label and a value of a random seed as inputs of the CNN module, and then supporting the CNN module to iteratively (i) generate one or more intermediate synthesized images and one or more intermediate synthesized labels, and (ii) receive the generated intermediate synthesized images and the generated intermediate synthesized labels as the inputs of the CNN module.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method of generating at least one image data set to be used for learning CNN capable of detecting at least one obstruction in one or more autonomous driving circumstances, comprising steps of:
   (a) a computing device acquiring (i) an original image representing a road driving circumstance and (ii) an initial synthesized label generated by using an original label corresponding to the original image and a bounding box corresponding to an arbitrary specific object wherein the arbitrary specific object does not relate to the original image
   (b) the computing device supporting a CNN module to generate a first synthesized image and a first synthesized label by using the original image and the initial synthesized label,
   wherein the first synthesized label is created by adding a specific label corresponding to the specific object to the original label at a location in the original label corresponding to a location of the bounding box, corresponding to the specific object, in the initial synthesized label, and wherein the first synthesized image is created by adding a specific image of the specific object to the original image at a location in the original image corresponding to the location of the bounding box, corresponding to the specific object, in the initial synthesized label, wherein, at step (a), the computing device further acquires (iii) a value of a random seed,
   wherein, at step (b), the computing device supports the CNN module to generate a plurality of adjusted first synthesized images by using the original image, the initial synthesized label, and the value of the random seed, wherein the adjusted first synthesized images are derived from the first synthesized image such that at least part of a size, a location, and a color of the specific object in each of the adjusted first synthesized images are adjusted from those of the specific object in the first synthesized image while changing the value of the random seed,
   wherein, the CNN module supports training processes of another CNN module by generating said plurality of the adjusted first synthesized images and their corresponding first synthesized label to be inputted to said another CNN module, and
   wherein the another CNN module is a separate CNN from the CNN module, and performs processes that are independent of the CNN module.

2. The method of claim 1,
   wherein the method further comprises a step of:
   (c) the, computing device supporting the CNN module to receive the first synthesized label, the first synthesized image, and the value of the random seed as inputs of the CNN module, and then supporting the CNN module to iteratively (i) generate one or more intermediate synthesized labels and one or more intermediate synthesized images and (ii) receive the generated intermediate synthesized labels and the generated intermediate synthesized images as the inputs of the CNN module, wherein, at the step of (c), while iteratively generating the intermediate synthesized labels and the intermediate synthesized images, the computing device iteratively combines the specific label and the specific image corresponding to the specific object with the generated intermediate synthesized labels and the generated intermediate synthesized images, respectively, such that the specific label and the specific image are respectively located at a same or similar location, corresponding to the location of the bounding box in the initial synthesized label, in the generated intermediate synthesized images and the generated intermediate synthesized labels, to thereby generate a second synthesized label and a second synthesized image.

3. The method of claim 1, wherein, on condition that shapes of bounding box candidates, to be provided for allowing the bounding box to be selected thereamong, corresponding to the specific object follow a probability distribution, a shape of the bounding box is determined by referring to the probability distribution.

4. The method of claim 3, wherein, on condition that widths and heights of the bounding box candidates corresponding to the specific object follow a first probability distribution and a second probability distribution respectively, the shape of the bounding box is determined by determining the width and the height by referring to the first and the second probability distributions respectively.

5. The method of claim 1, wherein, on condition that locations of the bounding box candidates corresponding to the specific object follow a probability distribution which is acquired by referring to information on relative locations of various objects, in various images, whose types and sizes are similar to a type and a size of the specific object, the location of the bounding box corresponding to the specific object is determined by referring to the probability distribution.

6. The method of claim 1, further comprising a step of:
(d) the computing device adding the first synthesized image and the first synthesized label into a database including training data sets to be used for one of object detection and image segmentation.

7. A computing device of generating at least one image data set to be used for learning CNN capable of detecting at least one obstruction in one or more autonomous driving circumstances, comprising:
a communication part for acquiring (i) an original image representing a road driving circumstance (ii) an initial synthesized label generated by using an original label corresponding to the original image and a bounding box corresponding to an arbitrary specific object wherein the arbitrary specific object does not relate to the original image, and (iii) a value of a random seed; and
a processor for performing a process of (I) supporting a CNN module to generate a first synthesized image and a first synthesized label by using the original image and the initial synthesized label, wherein the first synthesized label is created by adding a specific label corresponding to the specific object to the original label at a location in the original label corresponding to a location of the bounding box, corresponding to the specific object, in the initial synthesized label, and wherein the first synthesized image is created by adding a specific image of the specific object to the original image at a location in the original image corresponding to the location of the bounding box, corresponding to the specific object, in the initial synthesized label, wherein
at the process (I), the processor performs a process of supporting the CNN module to generate a plurality of adjusted first synthesized images by using the original image, the initial synthesized label, and the value of the random seed, wherein the adjusted first synthesized images are derived from the first synthesized image such that at least part of a size, a location, and a color of the specific object in each of the adjusted first synthesized images are adjusted from those of the specific object in the first synthesized image while changing the value of the random seed, and
the CNN module supports training processes of another CNN module by generating said plurality of the adjusted first synthesized images and their corresponding first synthesized label to be inputted to said another CNN module, wherein
the another CNN module is a separate CNN from the CNN module, and performs processes that are independent of the CNN module.

8. The device of claim 7,
wherein the processor further performs a process of:
(II) supporting the CNN module to receive the first synthesized label, the first synthesized image, and the value of the random seed as inputs of the CNN module, and then supporting the CNN module to iteratively (i) generate one or more intermediate synthesized labels and one or more intermediate synthesized images and (ii) receive the generated intermediate synthesized labels and the generated intermediate synthesized images as the inputs of the CNN module,
wherein, at the process of (II), while iteratively generating the intermediate synthesized labels and the intermediate synthesized images, the processor iteratively combines the specific label and the specific image corresponding to the specific object with the generated intermediate synthesized labels and the generated intermediate synthesized images, respectively, such that the specific label and the specific image are respectively located at a same or similar location corresponding to the location of the bounding box in the initial synthesized label, in the generated intermediate synthesized images and the generated intermediate synthesized labels, to thereby generate a second synthesized label and a second synthesized image.

9. The device of claim 7, wherein, on condition that shapes of bounding box candidates, to be provided for allowing the bounding box to be selected thereamong, corresponding to the specific object, follow a probability distribution, a shape of the bounding box is determined by referring to the probability distribution.

10. The device of claim 9, wherein, on condition that widths and heights of the bounding box candidates corresponding to the specific object follow a first probability distribution and a second probability distribution respectively, the shape of the bounding box is determined by determining the width and the height by referring to the first probability distribution and the second probability distributions respectively.

11. The device of claim 7, wherein, on condition that locations of the bounding box candidates corresponding to the specific object follow a probability distribution which is acquired by referring to information on relative locations of various images, in various images, whose types and sizes are similar to a type and a size of the specific object, the location of the bounding box corresponding to the specific object is determined by referring to the probability distribution.

12. The device of claim 7, wherein the processor further performs a process of:
(III) adding the first synthesized image and the first synthesized label into a database including training data sets to be used for one of object detection and image segmentation.

* * * * *